United States Patent [19]

Miyamoto et al.

[11] 4,433,136

[45] Feb. 21, 1984

[54] PROCESS FOR PREPARING POLYAMIDE IN UNIFORMLY FLUIDIZED STATE

[75] Inventors: Akira Miyamoto; Senzo Shimizu; Kazuo Yamamiya; Masahiro Harada, all of Kanagawa, Japan

[73] Assignee: Mitsubishi Gas Chemical Company Inc., Tokyo, Japan

[21] Appl. No.: 383,974

[22] Filed: Jun. 1, 1982

[30] Foreign Application Priority Data

Jun. 4, 1981 [JP] Japan .................................. 56-85922

[51] Int. Cl.³ .............................................. C08G 69/28
[52] U.S. Cl. .................................... 528/347; 528/335; 528/339; 528/340
[58] Field of Search ................ 528/347, 335, 339, 340

[56] References Cited

U.S. PATENT DOCUMENTS 2,840,547  6/1958  Stump .................................. 528/335

Primary Examiner—Harold D. Anderson
Attorney, Agent, or Firm—Browdy and Neimark

[57] ABSTRACT

A process for preparing a polyamide is provided. The polyamide is prepared by effecting direct polycondensation reaction of a dicarboxylic acid component containing at least 80 mole % of adipic acid and a diamine component containing at least 70 mole % of m-xylylene diamine under an atmosphere of an inert gas and at atmospheric pressure at a controlled temperature which is higher than the melting point of the dicarboxylic acid component and which can maintain the reaction mixture in a uniformly-fluidized state throughout the reaction.

10 Claims, No Drawings

PROCESS FOR PREPARING POLYAMIDE IN UNIFORMLY FLUIDIZED STATE

BACKGROUND OF THE INVENTION

1. Field of the Invention

The present invention relates to a new process for preparing a polyamide by direct polycondensation reaction of a diamine component and a dicarboxylic acid component. More particularly, the present invention relates to a process for preparing a polyamide economically which comprises mixing a molten dicarboxylic acid component containing adipic acid as a main component and a diamine component containing m-xylylene diamine as a main component, and reacting them directly at atmospheric pressure.

2. Description of the Prior Art

Generally, a polyamide is produced by polycondensing the salt formed from a dicarboxylic acid and a diamine (the so-called nylon salt) in an aqueous solution at a temperature just sufficient to polycondense the salt under pressure while distilling water away, which is used as a solvent of the nylon salt, and is formed by polycondensation of the salt.

The above conventional method requires not only much heat and extremely long periods of time for the reaction owing to the removal of water, but also the yield obtained per one batch is low, and thus it is uneconomical. Furthermore, in order to produce a polyamide having high quality by this conventional method, there are many problems to be solved. For example, the polymer deposits are formed on the wall of the reaction vessel owing to the remarkable change in liquid level of the reaction solution during the reaction, and the deposited polymer can be locally overheated and tends to degrade.

As a method of eliminating those drawbacks, it has been proposed that the nylon salt be directly subjected to polycondensation reaction without using any solvent. See, Japanese Patent Publication (Kokoku) Nos. 35-15700 and 43-22874. However, these methods are not much more efficient, because they require the steps for the isolation of the nylon salt and the purification thereof in using the same. Also, U.S. Pat. No. 2,840,547 discloses a method in which a diamine and a dicarboxylic acid are directly mixed and the mixture is brought about to the polycondensation reaction under pressure. Further, Japanese Patent Publication (Kokai) No. 48-12390 discloses a method in which a molten diamine containing water is mixed with a molten dicarboxylic acid on such a condition that polycondensation reaction proceeds as slow as possible, and then polycondensation reaction is effected at a temperature of less than 220° C. at atmospheric pressure.

However, a method comprising subjecting only a diamine and a dicarboxylic acid directly to polycondensation reaction at atmospheric pressure to produce a polyamide economically has, surprisingly, not been put into practice until now. Generally, in a case where the mixture of a dicarboxylic acid and a diamine is directly subjected to polycondensation reaction at atmospheric pressure, if the reaction mixture containing the starting materials is maintained in a uniformly fluidized state, it becomes difficult to avoid the loss of the diamine by evaporation. This causes the molecular weight of the product to vary from batch to batch. In order to prevent this loss, the polycondensation reaction is effected under pressure with steam. This means naturally that the apparatus for the polycondensation reaction must withstand the applied pressure, and the procedures of the polycondensation reaction must include both steps of keeping the reaction system under pressure and under reduced pressure. This is disadvantageous because the apparatus and operation are complicated and, also, the reaction time is long, in comparison with the case of carrying out direct polycondensation reaction at atmospheric pressure. Thus, any improvements in direct polycondensation process have been desired in practical use.

SUMMARY OF THE INVENTION

It is, therefore, a primary object of the present invention to provide a process for preparing a polyamide, specifically a polyamide derived from a dicarboxylic acid component containing adipic acid and a diamine component containing m-xylylene diamine, by direct polycondensation reaction at atmospheric pressure.

In accordance with the present invention, there is provided a process for preparing a polyamide which comprises effecting the polycondensation reaction of a diamine component containing at least 70 mole % of m-xylylene diamine and a dicarboxylic acid component containing at least 80 mole % of adipic acid at atmospheric pressure, characterized by starting the reaction at a temperature higher than the melting point of the dicarboxylic acid component, allowing the reaction to proceed while heating the reaction mixture at such a temperature that the reaction mixture is maintained in a uniformly-fluidized state, and further allowing the reaction to proceed by heating the reaction mixture at a temperature higher than 30° C. below the melting point of the resulting polyamide before conversion of the starting material to the polymer reaches 95%. By the procedure of the present invention, the reaction mixture is maintained in a uniformly fluidized state throughout the reaction.

According to the present invention, it becomes possible to prepare a polyamide by direct polycondensation of a dicarboxylic acid component and a diamine component at atmospheric pressure without using a solvent, and thus it becomes possible to shorten the reaction time, save energy (because no water is used as a solvent), and increase the charge amount of the starting materials as well as of the yield of the product. Accordingly, it can be said that the present invention has a most significant value in practical use.

DESCRIPTION OF THE PREFERRED EMBODIMENTS

In carrying out the process of the present invention, it is desirable to meet the following requirements:

(1) Replacing sufficiently the atmosphere in a reaction vessel with an inert gas;

(2) Effecting reaction at a controlled temperature which is higher than the melting point of the dicarboxylic acid component and which can maintain the rection mixture in a uniformly-fluidized state throughout the reaction; and (3) Using a reaction vessel with a stirrer, a partial condenser and a total condenser connected thereto.

These requirements are concretely described below.

In order to produce a polyamide having high quality according to the present invention, it is desirable to introduce an inert gas into the reaction vessel to replace sufficiently the atmosphere in the vessel with the gas prior to or after the feed of the dicarboxylic acid component. The dicarboxylic acid component may be fed to the reaction vessel either in a molten form or in a solid form, wherein the solid feed is melted by heating the vessel. The dicarboxylic acid component which may be used in the present invention should contain at least 80 mole % of adipic acid. Other dicarboxylic acids which may be used in combination with adipic acid may be one or more of aliphatic dicarboxylic acids, for example, succinic acid, glutaric acid, pimelic acid, suberic acid, azelaic acid, sebacic acid, undecanedioic acid, dodecanedioic acid, and the like.

The diamine component which may be used together with the dicarboxylic acid component in the present invention should contain at least 70 mole % of m-xylylene diamine. Other diamines which may be used in combination with m-xylylene diamine may be one or more diamines selected from the group consisting of an aliphatic diamine, such as tetramethylene diamine, pentamethylene diamine, hexamethylene diamine, octamethylene diamine, nonamethylene diamine, and the like; an aliphatic diamine having an aromatic ring other than m-xylylene diamine, such as p-xylylene diamine and the like; an aromatic diamine, such as p-phenylene diamine, and the like; and an alicyclic diamine, such as 1,3-bisamino-methylcyclohexane, 1,4-bisaminomethylcyclohexane, and the like.

While polycondensation reaction between the dicarboxylic acid component and the diamine component described above is started at a temperature higher than the melting point of the dicarboxylic acid component, in order to bring about substantially polycondensation reaction between both the components, it is desirable to raise the temperature to 160° C. or higher; such higher temperature makes it possible to maintain an oligoamide and/or a polyamide produced as an intermediate in a molten state, thereby maintaining the entire reaction mixture in a uniformly-fluidized state throughout the reaction.

According to the preferable embodiment of the present invention, polycondensation reaction may be effected by stirring a molten dicarboxylic acid component in a reaction vessel, adding a diamine component to the stirred acid component at atmospheric pressure and maintaining the reaction mixture at the controlled temperature prescribed above. The rate of adding the diamine component is chosen so as to establish the prescribed temperature, namely the temperature which permits maintenance of the reaction mixture containing the starting materials in a uniformly-fluidized state throughout the reaction. This rate of addition may be affected by the heat generated by polycondensation reaction between the dicarboxylic acid component and the diamine component described above; the heat required for the distillation and removal of water formed by the above polycondensation reaction; the heat supplied from the heating medium used as a heat source to the reaction mixture through the wall of the reaction vessel; the structure and operation of a partial condenser for separating water generated from the reaction mixture; and so on. The time required to add the diamine to the reaction mixture varies depending upon the size of the reaction vessel, but it is generally in the range of 0.5 to 10 hours. During this period, water, which is being generated and evaporated with the progress of polycondensation reaction, may be distilled away and removed from the reaction mixture through the partial condenser. The temperature of the distilate through the partial condenser is preferably held in a range of 100° C. to 120° C. The starting materials evaporated during the reaction, for example, m-xylylene diamine and adipic acid, may be separated from water by the partial condenser and then returned to the reaction vessel.

In the process of the present invention, an increase in the molecular weight of the product formed with the progress of polycondensation reaction results in a rising melting point of the product as well as a rising viscosity of the reaction mixture. A rise in the viscosity of the reaction mixture tends to prevent the temperature of the reaction mixture from rising by conduction through the wall of the reaction vessel, and as the result the reaction mixture tends to solidify. Therefore, the reaction temperature is preferably raised in relation to the progress of the reaction in such a way that the reaction products remain in a uniformly-fluidized state.

In the process of the present invention, the temperature control described above is carried out in such a way that the reaction mixture is maintained at a temperature higher than 30° C. below the melting point of the resulting polyamide before conversion of the starting materials to the polymer reaches 95%. The upper limit of the reaction temperature is preferably 50° C. above the melting point of the resulting polyamide in view of thermal histerisis of the product. In other words, the preferred temperature range is 80° C., extending from 30° C. below the polyamide MP to 50° C. thereabove. However, the upper value is not necessarily limited to such temperature and an even higher temperature is allowable, if desired.

If the reaction mixture is raised to a temperature of higher than that of 30° C. below the melting point of the resulting polymer after the conversion has reached 95%, a part of polyamide being produced begins to crystallize or solidify, and thus makes it very difficult to maintain the reaction mixture in a uniformly-fluidized state. Crystallization or solidification of the part of the polyamide being produced causes the viscosity of the reaction mixture to increase and the thermal conductivity thereof to decrease and consequently the entire reaction mixture could solidify. Under such a circumstance, industrial production of the polyamide is substantially impossible.

In the present invention, the temperature of the reaction mixture is preferably raised successively from a value in a range of the melting point of the resulting polyamide to 50° C. above the melting point thereof so as to maintain the mixture in a substantially uniformly-fluidized state after the conversion has reached 95% and until the reaction is completed. This is the practical embodiment of the present invention.

As described hereinbefore, while the reaction is started-up at a temperature of higher than the melting point of the starting dicarboxylic acid component and, preferably, of 160° C. or higher at which polycondensation reaction between the dicarboxylic acid component and the diamine component described above substantially occurs, the temperature of the reaction mixture can be raised to a temperature of higher than 30° C. below the melting point of the resulting polyamide at the time of starting-up the reaction. However, raising the reaction mixture to such a higher temperature from the earlier stage of the reaction is usually not preferable from the viewpoint of energy saving as well as from the viewpoint of thermal historisis of the product. Therefore, in general, the prescribed temperature described above is preferably established after the conversion of over 50% has been obtained.

In carrying out the process of the present invention, the apparatus for polycondensation reaction has preferably a partial condenser, and, if not using a partial condenser, it is difficult to avoid the loss of diamine component from the reaction mixture by evaporation. The use of the partial condenser makes it possible to effectively prevent the loss of the diamine component containing m-xylylene diamine, whereby the production of a polyamide having the predetermined molecular weight with good reproducibility becomes possible when, in particular, the molar ratio of the diamine component to the dicarboxylic acid component containing adipic acid is set within the range of 1.000±0.005.

The apparatus used in the process of the present invention can be constructed at a very low cost, since a pressure vessel is unnecessary. In addition, according to the present invention, it is possible to shorten markedly the time required for the polycondensation reaction because the operations of controlling pressure and of distilling and removing water as a solvent are not required. These operations are required in the prior processes described hereinbefore. Futhermore, the present invention makes is possible to improve the productivity with respect to the production of a polyamide owing to its being possible to increase the charge amount of starting materials per one batch. In addition, the process of the present invention requires no heat for the concentration of an aqueous solution. Thus, the present invention provides a very economical method for producing a polyamide by direct polycondensation reaction.

The examples set forth below describe specific embodiments of the present invention but do not limit the invention.

EXAMPLE 1

A 3000 cc flask equipped with a stirrer, a partial condenser, a total condenser connected thereto, a thermometer, a dropping funnel and a nitrogen gas-supplying pipe was charged with exactly 731 g of adipic acid. Nitrogen gas was introduced into the flask through the nitrogen gas-supplying pipe to replace sufficiently the air in the flask with the nitrogen gas and then adipic acid was uniformly melted by heating the flask to 160° C. while flowing a small amount of nitrogen gas. To the melt 612.9 g of m-xylylene diamine was added dropwise through the dropping funnel over a period of 50 minutes with stirring. During the addition of the diamine, the reaction mixture was continuously raised to 223° C. Thereafter, a further 68.1 g of m-xylylene diamine was continuously added dropwise to the mixture over a period of 20 minutes with stirring. During the addition of the additional diamine, the reaction temperature was continuously raised from 223° C. to 243° C. Water, which was being generated and evaporated with the addition of m-xylylene diamine, was distilled and removed from the reaction mixture through the partial condenser and then through the total condenser connected to the partial condenser. After the adding of the diamine, the temperature of the reaction mixture was raised to 260° C. and the reaction was continued for another 2 hours. Throughout the process of this reaction, the reaction mixture remained in a uniformly-fluidized state without any solidification or precipitation of the resulting oligoamide or polyamide.

The polyamide finally obtained had a relative viscosity of 2.16 as measured on a solution of 1 g of polymer in 100 ml of sulphuric acid (96% by weight), and a melting point of 243° C. The molar proportion of m-xylylene diamine distilled and removed from the reaction mixture during the reaction was 0.14% of the total amount of the added diamine.

EXAMPLE 2

A 3000 cc flask equipped with a stirrer, a partial condenser, a total condenser connected thereto, a thermometer, a dropping funnel and a nitrogen gas-supplying pipe was charged with exactly 731 g of adipic acid. Nitrogen gas was introduced into the flask through the nitrogen gas-supplying pipe to replace sufficiently the air in the flask with the nitrogen gas and then adipic acid was uniformly melted by heating the flask to 160° C. while flowing a small amount of nitrogen gas. To the melt 544.8 g of mixed xylylene diamine composed of m- and p-xylylene diamines in a molar ratio of 9/1 was added dropwise through the dropping funnel over a period of 40 minutes with stirring. During the addition of the diamine, the temperature of the reaction mixture was continuously raised to 225° C. Thereafter, a further 136.2 g of the same mixed diamine as described above was added dropwise to the reaction mixture over a period of 20 minutes with stirring. During the addition of the additional mixed diamine, the reaction temperature was continuously raised from 225° to 245° C. Water, which was being generated and evaporated with the addition of the mixed diamine, was distilled and removed from the reaction mixture through the partial condenser and then through the total condenser connected to the partial condenser. After the adding of the mixed diamine, the temperature of the reaction mixture was raised to 260° C., a pressure of water vapor in the flask was decreased to 600 mm Hg, and the reaction was continued for another one and a half hours. Throughout the process of this reaction, the reaction mixture remained in a uniformly-fluidized state without any solidification or precipitation of the resulting oligoamide or polyamide.

The polyamide finally obtained had a relative viscosity of 2.27 as measured in the same manner as in Example 1 and a melting point of 245° C. The molar proportion of the mixed diamine distilled and removed from the reaction mixture during the reaction was 0.2% of the total amount of the added diamine.

EXAMPLE 3

The same flask as in Example 1 was charged with exactly 731 g of adipic acid. Nitrogen gas was introduced into the flask to replace sufficiently the air in the flask with the nitrogen gas and then adipic acid was uniformly melted at a temperature of 160° C. while flowing a small amount of nitrogen gas. To the melt 578.9 g of mixed xylylene diamine composed of m- and p-xylylene diamines in a molar ratio of 8/2 was added dropwise over a period of 50 minutes with stirring. During the addition of the diamine, the temperature of the reaction mixture was continuously raised to 235° C. Thereafter, further 102.1 g of the same mixed diamine as described above was added dropwise to the reaction mixture over a period of 20 minutes with stirring. During the addition of the additional mixed diamine, the reaction temperature was continuously raised from 235° to 255° C. Water, which was being generated and evaporated with the addition of the mixed diamine, was distilled and removed from the reaction mixture through the partial condenser and then through the total condenser connected to the partial condenser. After the adding of the mixed diamine, the temperature of the reaction mixture was raised to 270° C. and the reaction was continued for another 2 hours. Throghout the process of this reaction, the reaction mixture remained in a uniformly-fluidized state without any solidification or precipitation of the resulting oligoamide or polyamide.

The resulting polymer had a relative viscosity of 2.10 as measured in the same manner as in Example 1 and a melting point of 255° C.

EXAMPLE 4

The same flask as in Example 1 was charged with exactly 647 g of adipic acid and exactly 50.6 g of sebacic acid. Nitrogen gas was introduced into the flask to replace sufficiently the air in the flask with the nitrogen gas and then both the acids were uniformly melt together at 155° C. under flowing a small amount of nitrogen gas. To the melt 578.9 g of m-xylylene diamine was added dropwise over a period of 40 minutes while raising the temperature of the reaction mixture continuously to 210° C. Thereafter, a further 102.1 g of m-xylylene diamine was added dropwise to the mixture over a period of 20 minutes with stirring. During the addition of the additional diamine, the reaction temperature was continuously raised from 210° to 245° C. Water, which was being generated and evaporated with the progress of the reaction, was distilled and removed from the reaction mixture through the partial condenser and then through the total condenser connected to the partial condenser. After the adding of the diamine, the temperature of the reaction mixture was raised to 255° C. and the reaction was continued for another 2 hours. Throughout the process of this reaction, the reaction mixture remained in a uniformly-fluidized state without any solidification or precipitation of the resulting oligoamide or polyamide.

The resulting polymer had a melting point of 240° C. and a relative viscosity of 2.08 as measured in the same manner as in Example 1.

What is claimed is:

1. A process for preparing a polyamide which comprises effecting the polycondensation reaction of a reaction mixture comprising a diamine component containing at least 70 mole % of m-xylylene diamine and a dicarboxylic acid component containing at least 80 mole % of adipic acid at atmospheric pressure, characterized by starting the reaction at a temperature higher than the melting point of said dicarboxylic acid component; continuing the reaction while heating the reaction mixture at such a temperature that the reaction mixture is mantained in a uniformly-fluidized state; and further continuing the reaction, with the reaction mixture being maintained in a uniformly-fluidized state, by heating the reaction mixture at a temperature higher than the melting point of the resulting polyamide or lower than said melting point by an amount not exceeding 30° C. before conversion of said components to the polymer reaches 95%.

2. The process according to claim 1 wherein the dicarboxylic acid component further contains one or more aliphatic dicarboxylic acids other than adipic acid.

3. The process according to claim 2 wherein the aliphatic acid is selected from the group consisting of succinic acid, glutaric acid, pimelic acid, suberic acid, azelaic acid, sebacic acid, undeconedioic acid, dodeconedioic acid, and a mixture thereof.

4. The process according to claim 1 wherein the diamine component further contains one or more diamines selected from the group consisting of an aliphatic diamine, an aliphatic diamine having an aromatic ring other than m-xylylene diamine, an aromatic diamine and an alicyclic diamine.

5. The process according to claim 1 wherein the polycondensation reaction is effected under an atmosphere of an inert gas.

6. The process according to claim 1 wherein the polycondensation reaction is started at a temperature of 160° C. or higher.

7. The process according to claim 1 wherein the reaction mixture is heated to a temperature higher than the melting point of the resulting polyamide or lower than said melting point by an amount not exceeding 30° C. after the conversion of over 50% has been obtained.

8. The process according to claim 1 wherein the upper limit of temperature of the reaction mixture to be heated is a temperature higher than the melting point of the resulting polyamide by an amount of 50° C.

9. The process according to claim 1 wherein the starting components evaporated during the polycondensation reaction is separated from water, which is being generated and evaporated with the progress of the polycondensation reaction, by fractional distillation using a partial condenser and is returned to the reaction mixture.

10. The process according to claim 9 wherein the molar ratio of the diamine component to the dicarboxylic acid component is in the range of 1.000±0.005.

* * * * *